(12) United States Patent
Smith

(10) Patent No.: US 12,031,457 B2
(45) Date of Patent: Jul. 9, 2024

(54) COMBINED CYCLE POWER PLANT HAVING REDUCED PARASITIC PUMPING LOSSES

(71) Applicant: General Electric Company, Schenectady, NY (US)

(72) Inventor: Raub Warfield Smith, Ballston Lake, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/972,606

(22) Filed: Oct. 25, 2022

(65) Prior Publication Data
US 2024/0133320 A1    Apr. 25, 2024

(51) Int. Cl.
| F01K 23/10 | (2006.01) |
| F01K 7/16 | (2006.01) |
| F22D 5/34 | (2006.01) |

(52) U.S. Cl.
CPC .............. F01K 23/108 (2013.01); F01K 7/16 (2013.01); *F22D 5/34* (2013.01)

(58) Field of Classification Search
CPC ............. F01K 23/108; F01K 7/16; F22D 5/34
See application file for complete search history.

(56) References Cited

U.S. PATENT DOCUMENTS

| 4,932,204 A * | 6/1990 | Pavel ...................... F02C 7/224 60/39.182 |
| 5,845,481 A | 12/1998 | Briesch et al. |
| 6,244,039 B1 | 6/2001 | Sugishita et al. |
| 6,269,626 B1 * | 8/2001 | Kim .......................... F02C 6/18 122/7 B |
| 6,389,794 B2 * | 5/2002 | Ranasinghe .......... F01K 23/106 60/39.182 |
| 6,499,302 B1 * | 12/2002 | Ranasinghe .......... F01K 23/106 60/39.182 |

(Continued)

FOREIGN PATENT DOCUMENTS

| CA | 2276696 A1 | 7/1998 |
| CN | 105041477 A | 11/2015 |

(Continued)

OTHER PUBLICATIONS

PCT International Search Report Corresponding to PCT/US23/77289 on Feb. 16, 2024.

*Primary Examiner* — Jesse S Bogue
(74) *Attorney, Agent, or Firm* — Dority & Manning, P.A.

(57) ABSTRACT

A combined cycle power plant (CCPP) is provided. The CCPP includes a gas turbine that has a compressor section, a combustion section, and a turbine section. The CCPP further includes a heat recovery steam generator (HRSG) that has a first economizer. The HRSG receives a flow of exhaust gas from the turbine section. The HRSG further includes a fuel heating system that has a fuel supply line and a high temperature heat exchanger disposed in thermal communication on the fuel supply line. The fuel supply line is fluidly coupled to the combustion section. The high temperature heat exchanger is fluidly coupled to the first economizer such that the high temperature heat exchanger receives water from the first economizer. The CCPP further includes a feedwater pump that is fluidly coupled to the high temperature heat exchanger.

18 Claims, 6 Drawing Sheets

(56) References Cited

U.S. PATENT DOCUMENTS

| | | | |
|---|---|---|---|
| 6,536,205 B2 | 3/2003 | Sugishita et al. | |
| 6,920,760 B2 * | 7/2005 | Schottler | F02C 7/224 60/39.182 |
| 7,487,642 B2 | 2/2009 | Joshi et al. | |
| 8,015,793 B2 * | 9/2011 | Austin | F02C 7/224 60/39.52 |
| 9,074,494 B2 * | 7/2015 | Pang | F22G 5/04 |
| 9,404,393 B2 * | 8/2016 | Pang | F01K 23/108 |
| 10,006,313 B2 * | 6/2018 | Drouvot | F02C 7/224 |
| 10,830,105 B2 * | 11/2020 | Gupta | F02C 3/22 |
| 10,900,418 B2 * | 1/2021 | Selfridge | F02C 7/224 |
| 10,975,771 B2 | 4/2021 | Nakazawa et al. | |
| 11,274,575 B2 * | 3/2022 | Uechi | H02K 7/18 |
| 11,300,011 B1 | 4/2022 | Feher | |
| 11,434,786 B2 * | 9/2022 | Deng | F01K 23/10 |
| 2007/0017207 A1 * | 1/2007 | Smith | F02C 6/18 60/39.182 |
| 2013/0074508 A1 * | 3/2013 | Sholes | F02C 6/003 60/772 |
| 2015/0007575 A1 | 1/2015 | Drouvot et al. | |
| 2015/0192037 A1 | 7/2015 | Sharp et al. | |
| 2015/0300261 A1 | 10/2015 | Kim et al. | |
| 2018/0119618 A1 | 5/2018 | Erickson et al. | |
| 2019/0093518 A1 | 3/2019 | Juretzek | |
| 2019/0093563 A1 | 3/2019 | Selfridge et al. | |
| 2023/0022466 A1 * | 1/2023 | Uechi | F01K 23/10 |

FOREIGN PATENT DOCUMENTS

| | | |
|---|---|---|
| CN | 103016157 A | 4/2017 |
| CN | 109026400 A | 12/2018 |
| CN | 209145714 U | 7/2019 |
| EP | 1327057 B1 | 5/2009 |
| EP | 2824294 A1 | 1/2015 |
| EP | 1780389 B1 | 10/2016 |
| JP | 2007032568 A | 2/2007 |
| JP | 2012149542 A | 8/2012 |
| JP | 2013117209 A | 6/2013 |
| JP | 2015068314 A | 4/2015 |
| KR | 101781627 B1 | 9/2017 |
| KR | 20190108639 A | 9/2019 |
| WO | WO95000747 A1 | 1/1995 |
| WO | WO2018190231 A1 | 10/2018 |

* cited by examiner

COMBINED CYCLE POWER PLANT HAVING REDUCED PARASITIC PUMPING LOSSES

FIELD

The present disclosure relates generally to combined cycle power plant systems. In particular, the present disclosure relates to a combined cycle power plant system having a fuel heating system with reduced parasitic pump loss.

BACKGROUND

A gas turbine power plant such as a combined cycle power plant (CCPP) generally includes a gas turbine having a compressor section, a combustion section, a turbine section, a heat recovery steam generator (HRSG) that is disposed downstream from the turbine and at least one steam turbine in fluid communication with the HRSG. During operation, air enters the compressor via an inlet system and is progressively compressed as it is routed towards a compressor discharge or diffuser casing that at least partially surrounds the combustor(s) of the combustion section. At least a portion of the compressed air is mixed with a fuel and burned within a combustion chamber defined within the combustor(s), thereby generating high temperature and high pressure combustion gases.

The combustion gases are routed along a hot gas path from the combustor through the turbine where they progressively expand as they flow across alternating stages of stationary vanes and rotatable turbine blades which are coupled to a rotor shaft. Energy is transferred from the combustion gases to the turbine blades, causing the rotor shaft to rotate. The rotational energy of the rotor shaft may be converted to electrical energy via a generator. The combustion gases exit the turbine as exhaust gas, and the exhaust gas enters the HRSG. Thermal energy from the exhaust gas is transferred to water flowing through one or more heat exchangers of the HRSG, thereby producing superheated steam. The superheated steam is then routed into the steam turbine which may be used to generate additional electricity, thus enhancing overall power plant efficiency.

In many HRSG systems, water from one or more sections of the HRSG may be diverted and used in a fuel heating circuit for pre-heating fuel (e.g., via a heat exchanger). The pre-heated fuel may then be supplied to the combustion section of the gas turbine. The water pressure of the fuel heating circuit must be sufficiently high to ensure the water remains in a liquid phase at the hottest operating conditions.

Known fuel heating systems are thus configured to supply water to the fuel heater at pressure sufficient to avoid flashing. The spent water leaving the fuel heater is returned to the feedwater circuit either at the condensate line feeding the low-pressure economizer or at the condenser hotwell. The power required to repressurize this water for heating in the HRSG and to return the reheated water to the fuel heater represents a parasitic loss against the performance benefit of capturing low grade exhaust energy into the fuel. As the target temperature for the heated fuel increases, water pressure must increase exponentially. As a result, the parasitic power lost to repressurizing and circulating water for fuel heating becomes a more significant drag on CCPP performance.

Accordingly, an improved HRSG system that includes a fuel heating circuit with reduced parasitic pumping losses compared to prior designs is desired and would be appreciated in the art.

BRIEF DESCRIPTION

Aspects and advantages of the combined cycle power plants and feedwater pump control systems in accordance with the present disclosure will be set forth in part in the following description, or may be obvious from the description, or may be learned through practice of the technology.

In accordance with one embodiment, a combined cycle power plant (CCPP) is provided. The CCPP includes a gas turbine that has a compressor section, a combustion section, and a turbine section. The CCPP further includes a heat recovery steam generator (HRSG) that has a first economizer. The HRSG receives a flow of exhaust gas from the turbine section. The HRSG further includes a fuel heating system that has a fuel supply line and a high temperature heat exchanger disposed in thermal communication on the fuel supply line. The fuel supply line is fluidly coupled to the combustion section. The high temperature heat exchanger is fluidly coupled to the first economizer such that the high temperature heat exchanger receives water from the first economizer. The CCPP further includes a feedwater pump that is fluidly coupled to the high temperature heat exchanger.

In accordance with another embodiment, a combined cycle power plant (CCPP) is provided. The CCPP includes a gas turbine that has a compressor section, a combustion section, and a turbine section. The CCPP further includes a heat recovery steam generator (HRSG) that receives a flow of exhaust gas from the turbine section. The HRSG includes a high pressure economizer and a low pressure economizer. The CCPP further includes a fuel heating system that has a fuel supply line, a high temperature heat exchanger, and a low temperature heat exchanger. The fuel supply line is fluidly coupled to the combustion section. The high temperature heat exchanger and the low temperature heat exchanger are disposed in thermal communication on the fuel supply line. The high temperature heat exchanger is fluidly coupled to the high pressure economizer, and the low temperature heat exchanger is fluidly coupled to the low pressure economizer. The CCPP further includes a feedwater pump that is fluidly coupled to the high temperature heat exchanger.

In accordance with yet another embodiment, a feedwater pump control system is provided. The feedwater pump control system includes a heat recovery steam generator (HRSG) that has a low pressure economizer and at least one high pressure economizer. The feedwater pump control system further includes a fuel heating system that has a fuel supply line fluidly coupled to a combustion section. The fuel heating system further includes a high temperature heat exchanger and a low temperature heat exchanger disposed in thermal communication on the fuel supply line. The feedwater pump control system further includes a feedwater pump that has a plurality of stages. A first pump supply line extends between one of the low pressure economizer, a low pressure steam drum, or a deaerator, and an initial stage of the plurality of stages. A second pump supply line extends between the high temperature heat exchanger and an intermediate stage of the plurality of stages. A feedwater supply line extends between a last stage of the plurality of stages and the at least one high pressure economizer. The feedwater pump control system further includes a sensor that is disposed on one or more of the first pump supply line, the second pump supply line, and the feedwater supply line. One or more sensors is configured to provide data indicative of at least one of a pressure, a temperature, or a flow rate of water. One or more valves is disposed on one or more the second pump supply line and the first feedwater supply line. The feedwater pump control system further includes a controller that communicatively coupled to the one or more sensors and operatively coupled to the one or more valves. The controller includes a memory and one or more processors. The memory stores instructions that when executed by the one or more processors causes the feedwater pump control system to perform operations. The operations include monitoring data indicative of a temperature difference between water entering the feedwater pump and water exiting the feedwater pump via the one or more sensors. The operations further include determining when the temperature difference is outside of a predetermined temperature range. The operations further include adjusting a flow of water to the feedwater pump by actuating the one or more valves to restore the temperature difference to be within the predetermined temperature range.

These and other features, aspects and advantages of the present combined cycle power plants and feedwater pump control systems will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present combined cycle power plants and feedwater pump control systems, including the best mode of making and using the present systems and methods, directed to one of ordinary skill in the art, is set forth in the specification, which makes reference to the appended figures, in which.

DETAILED DESCRIPTION

Figure 1:
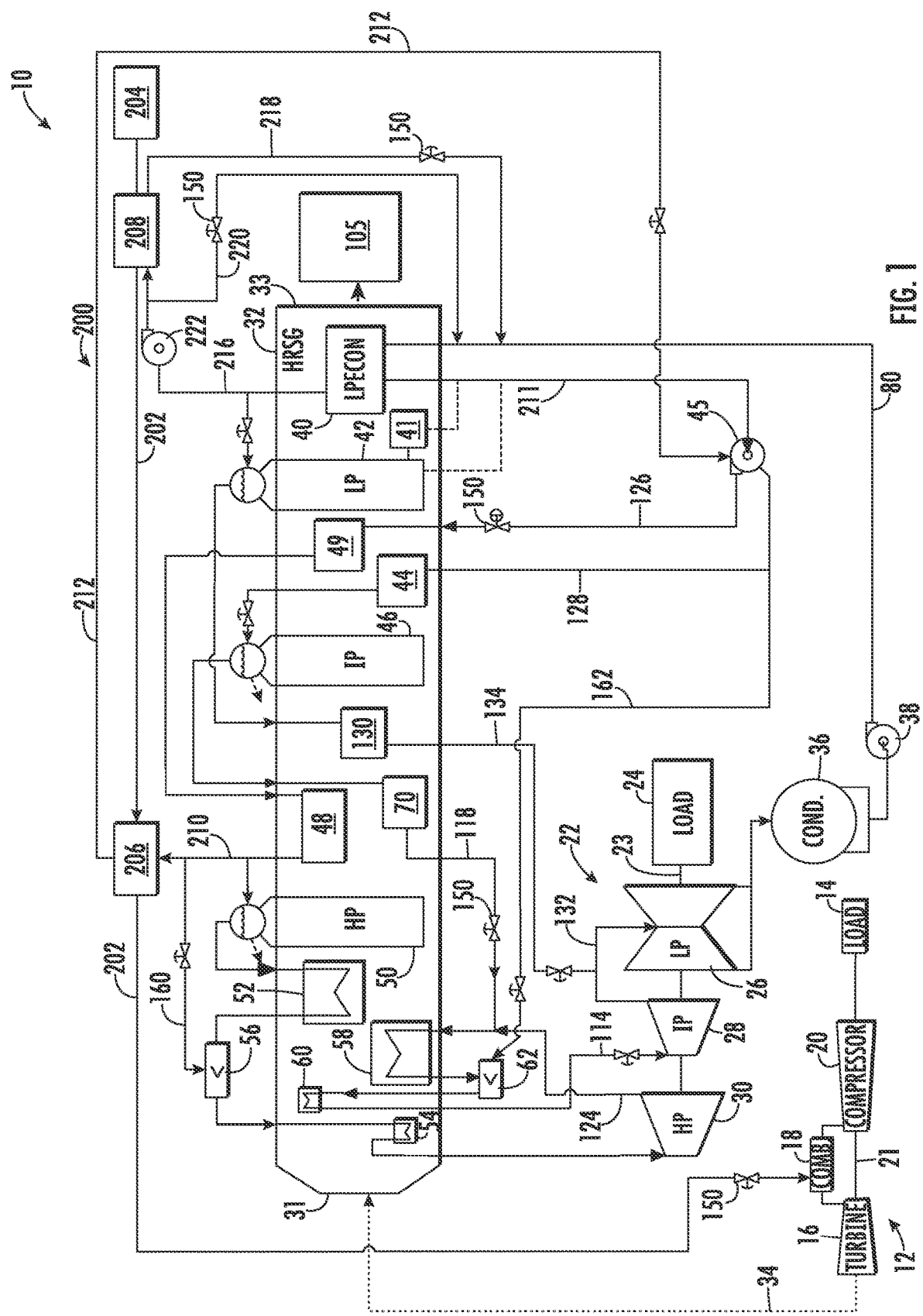
FIG. 1 is a schematic illustration of a combined cycle power plant (CCPP) in accordance with embodiments of the present disclosure.

Reference now will be made in detail to embodiments of the present combined cycle power plants and feedwater pump control systems, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The terms "forward" and "aft" refer to positions relative to an inlet and an outlet, respectively, of a system (e.g., of a turbomachine or a heat recovery steam generator) with components nearer the inlet being considered "forward" and components nearer the outlet being considered "aft."

The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a nonexclusive inclusion. For example, a process, method, article, or apparatus that comprises a list of features is not necessarily limited only to those features but may include other features not expressly listed or inherent to such process, method, article, or apparatus. Further, unless expressly stated to the contrary, "and/or" refers to an inclusive-or and not to an exclusive-or. For example, a condition A and/or B is satisfied by any one of the following: A is true (or present) and B is false (or not present), A is false (or not present) and B is true (or present), and both A and B are true (or present).

Here and throughout the specification and claims, where range limitations are capable of being combined and interchanged, such ranges are identified and include all the sub-ranges contained therein unless context or language indicates otherwise. For example, all ranges disclosed herein are inclusive of the endpoints, and the endpoints are independently combinable with each other.

As used herein, "line" may refer to a pipe, hose, or any other suitable fluid conduit or fluid carrying ductwork.

As used herein, the terms "high," "intermediate," and "low," or their respective comparative degrees (e.g., -er where applicable), when used in the context of a system component, may refer to a parameter associated with a particular system component when compared to other system components. For example, a low pressure economizer, an intermediate pressure economizer, and a high pressure economizer may be defined relative to each other (i.e., the low pressure economizer conveys a fluid at a lower pressure relative to the intermediate/high pressure economizers, and so forth).

FIGS. 1, 2, and 4 through 6 are each schematic flow diagrams of an embodiment of a combined cycle power generation system or combined cycle power plant (CCPP) 10 in accordance with embodiments of the present disclosure. The CCPP 10 may include a gas turbine 12 for driving a first load 14. The first load 14 may, for instance, be an electrical generator for producing electrical power. The gas turbine 12 may include a turbine section 16, combustors or a combustion section 18, and a compressor section 20. The turbine section 16 and the compressor section 20 may be connected by one or more shafts 21.

During operation of the gas turbine 12, a working fluid such as air flows into the compressor section 20 where the air is progressively compressed, thus providing compressed air to the combustor(s) of combustion section 18. The compressed air is mixed with fuel and burned within each combustor to produce combustion gases. The combustion gases flow through the hot gas path from the combustion section 18 into the turbine section 16, where energy (kinetic and/or thermal) is transferred from the combustion gases to the rotor blades, causing the one or more shafts 21 to rotate. The mechanical rotational energy may then be used to power the compressor section 20 and/or to generate electricity. Heated exhaust gas 34 exiting the turbine section 16 may then be exhausted from the gas turbine 12 and into a heat recovery steam generator (HRSG) 32, where a heat transfer takes place between the heated exhaust gas 34 and the various components of the HRSG. In this way, HRSG 32 may receive a flow of exhaust gas 34 from the turbine section 16 at an inlet 31, which may be conveyed through the HRSG 32 over the various components contained therein to an outlet 33. The exhaust gas 34 may exit the HRSG 32 to the atmosphere via an exhaust stack 105.

The CCPP 10 may also include a steam turbine system 22 for driving a second load 24. The second load 24 may also be an electrical generator for generating electrical power. However, both the first and second loads 14, 24 may be other types of loads capable of being driven by the gas turbine 12 and steam turbine system 22. In addition, although the gas turbine 12 and steam turbine system 22 may drive separate loads 14 and 24, as shown in the illustrated embodiment, the gas turbine 12 and steam turbine system 22 may also be utilized in tandem to drive a single load via a single shaft.

In the illustrated embodiment, the steam turbine system 22 may include one low pressure (LP) steam turbine 26, one intermediate pressure (IP) steam turbine 28, and one high pressure (HP) steam turbine 30. The low pressure (LP) steam turbine 26, the intermediate pressure (IP) steam turbine 28, the high pressure (HP) steam turbine 30, and the load 24 may each be disposed on one or more shafts 23 (such as a common shaft in some embodiments). In other embodiments, the LP steam turbine 26, the IP steam turbine 28, and the HP steam turbine 30 may be disposed on separate shafts (which may be coupled to one another). In some embodiments, the LP steam turbine 26 and the IP steam turbine 28 may be disposed on a common shaft of the one or more shafts to form an LP/IP steam turbine, while the HP steam turbine 30 may be on a separate shaft or not included in the system.

The CCPP 10 may also include an HRSG 32 having multiple stages. The components of the HRSG 32 in the illustrated embodiment are a simplified depiction of the HRSG 32 and are not intended to be limiting. Rather, the illustrated HRSG 32 is shown to convey the general operation of such HRSG systems. Heated exhaust gas 34 from the gas turbine 12 may be transported into the HRSG 32 and used to heat steam used to power the steam turbine system 22.

Exhaust from the low pressure steam turbine 26 of the steam turbine system 22 may be directed into a condenser 36. Condensate from the condenser 36 may, in turn, be directed into a low pressure section of the HRSG 32 with the aid of a condensate pump 38. The condensate may then flow through a low pressure economizer 40 (LPECON), which may be used to heat the condensate. For example, a condensate supply line 80 may extend between, and fluidly couple, the condenser 36 and the LPECON 40. The condensate pump 38 may be disposed in fluid communication on the condensate supply line 80.

Figure 2:
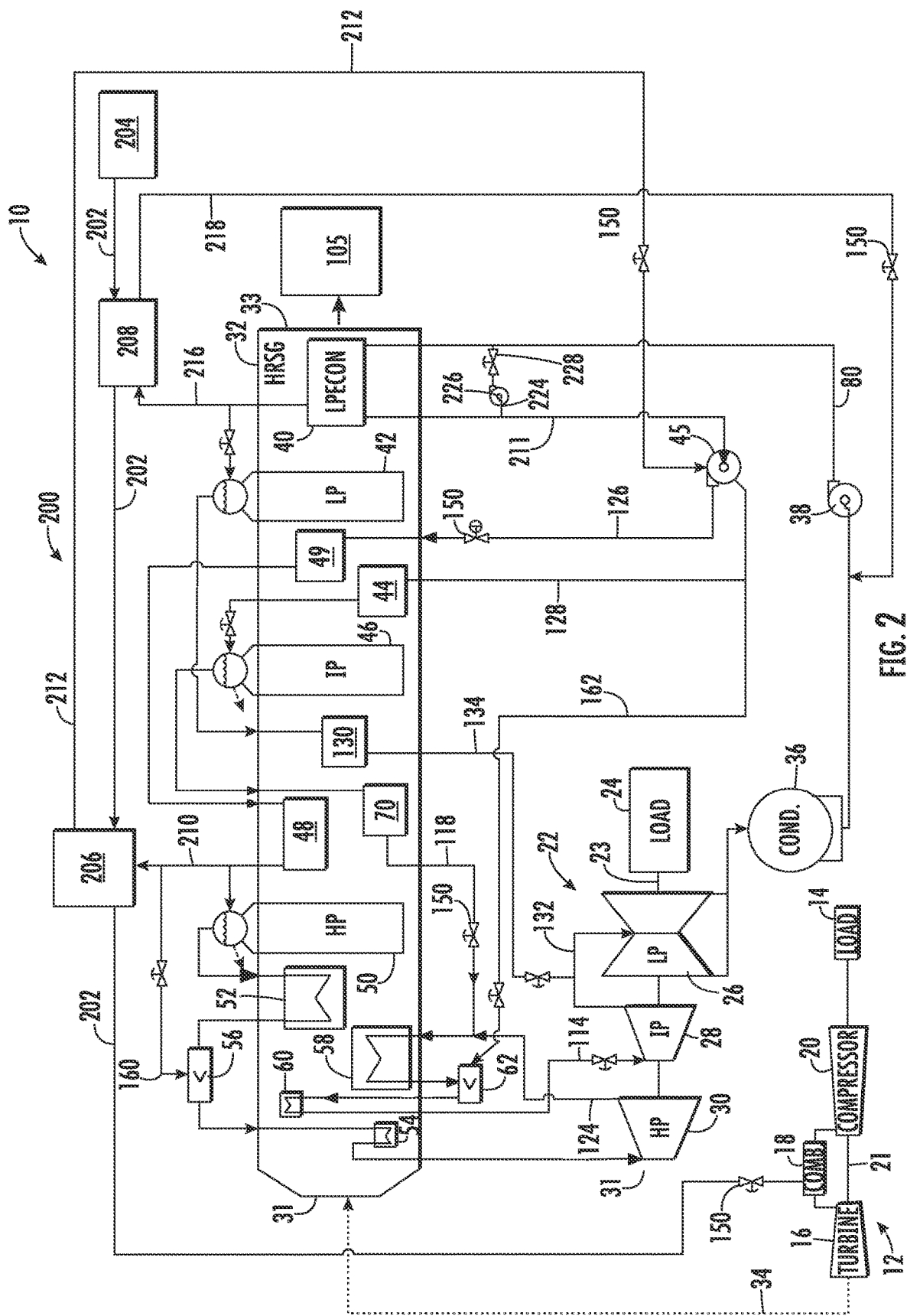
FIG. 2 is a schematic illustration of a combined cycle power plant (CCPP) in accordance with embodiments of the present disclosure.

From the low pressure economizer 40, the condensate (e.g., water) may either be directed into a low pressure evaporator 42 (LPEVAP), toward a feedwater pump 45, and/or towards the low temperature fuel heating heat exchanger 208 (FIGS. 1 and 2). From the feedwater pump 45, the feedwater may flow into either the IPECON 44 or an aft high pressure economizer 49 (HPECON), e.g., via two separate pipes, tubes, or fluid conduits. For example, a first feedwater supply line 126 may extend from the feedwater pump 45 to the aft HPECON 49, and a second feedwater line 128 may extend from the feedwater pump 45 to the IPECON 44. From the intermediate pressure economizer 44, the feedwater may be directed into an intermediate pressure evaporator 46 (IPEVAP). Additionally, from the aft HPECON 49, the condensate may flow into a forward high pressure economizer 48 (HPECON). The embodiments shown in FIGS. 1 through 5 may include a plurality of economizers, and it should be appreciated that the term "economizer" may be in reference to any one of the plurality of economizers, such as the LPECON 40, the IPECON 44, the aft HPECON 49, or the forward HPECON 48.

In many embodiments, the CCPP 10 may further include a low pressure superheater 130 disposed within the HRSG 32. The low pressure superheater 130 may be a heat exchanger that transfers heat between the steam traveling therethrough and the exhaust gas 34 traveling through the HRSG 32. The low pressure superheater 130 may receive steam from the LPEVAP 42 (and subsequently superheat said steam). Steam from the low pressure superheater 130, along with steam from the exhaust of the intermediate pressure steam turbine 28, may mix together and be supplied to the low pressure steam turbine 26. For example, a connection line 132 may fluidly couple the outlet of the intermediate pressure steam turbine 28 to an inlet of the low pressure steam turbine 26. An outlet line 134 extends from the low pressure superheater 130 to the connection line 132, thereby fluidly coupling the low pressure superheater 130 to the connection line 132. Note that while FIGS. 1-5 each depict a steam turbine system 22 with separate IP and LP turbine casings connected by a crossover pipe, it should be appreciated that a steam turbine system may combine a single IP/LP turbine casing (with provision for an interstage admission for LP steam) without departing from the scope and/or spirit of the present disclosure.

Similarly, the CCPP 10 may further include an intermediate pressure superheater 70 disposed within the HRSG 32. The intermediate pressure superheater 70 may be a heat exchanger that transfers heat between the steam traveling therethrough and the exhaust gas 34 traveling through the HRSG 32. The intermediate pressure superheater 70 may receive steam from the IPEVAP 46 (and subsequently superheat said steam). In some embodiments, the intermediate pressure superheater 70 may be disposed within the HRSG 32 upstream (e.g., immediately or directly upstream) of the low pressure superheater 130 with respect to the flow of heated exhaust gas 34 through the HRSG 32. Steam from the intermediate pressure superheater 70, along with steam from the exhaust of the high pressure steam turbine 30, may mix together and be supplied to a primary reheater 58. For example, an outlet line 118 may extend from the intermediate pressure superheater 70 to a junction with an outlet line 124 of the high pressure steam turbine 30.

Each of the economizers (e.g., the LPECON 40, the IPECON 44, the aft HPECON 49, and the forward HPECON 48) described herein may be devices configured to heat feedwater or condensate, with heated exhaust gas 34. In this way, the LPECON 40, the IPECON 44, the aft HPECON 49, and the forward HPECON 48 may be heat exchangers that transfer heat between the heated exhaust gas 34 generated by the gas turbine 12 and the water used for the steam turbine system 22. The HRSG 32 may include a plurality of economizers arranged in the following serial flow order (from upstream to downstream with respect to the flow of exhaust gas 34 through the HRSG 32): the forward HPECON 48, the IPECON 44, the aft HPECON 49, and the LPECON 40. In this arrangement, the forward HPECON 48 may be disposed within the HRSG 32 upstream of the IPECON 44. The IPECON 44 may be disposed within the HRSG 32 upstream of the aft HPECON 49. The aft HPECON 49 may be disposed within the HRSG 32 upstream of the LPECON 40. In general, the operating temperature of the economizers may decrease from a forward end to an aft end of the HRSG 32 (e.g., economizers closer to the forward end of the HRSG 32 will operate hotter than economizers closer to the aft end of the HRSG 32).

Finally, feedwater from the forward high pressure economizer 48 may be directed into a high pressure evaporator 50 (HPEVAP) and/or a high temperature fuel heating heat exchanger 206. Steam exiting the high pressure evaporator 50 may be directed into a primary high pressure superheater 52 and a finishing high pressure superheater 54, where the steam is superheated and eventually sent to the high pressure steam turbine 30 of the steam turbine system 22. The superheaters 52, 54 may each be heat exchangers that transfer heat from the heated exhaust gas 34 from the gas turbine 12 traveling through the HRSG 32 to the steam used for the steam turbine system 22.

An inter-stage attemperator 56 may be located in fluid communication between the primary high pressure superheater 52 and the finishing high pressure superheater 54. The inter-stage attemperator 56 may allow for more robust control of the discharge temperature of steam from the finishing high pressure superheater 54. Specifically, the inter-stage attemperator 56 may be configured to control the temperature of steam exiting the finishing high pressure superheater 54 by injecting cooler feedwater spray into the superheated steam from upstream of the finishing high pressure superheater 54 whenever the discharge temperature of the steam exiting the finishing high pressure superheater 54 exceeds a predetermined value. For example, the cooler feedwater spray may be water from the forward HPECON 48. Particularly, the inter-stage attemperator 56 may be in fluid communication with the HPECON via a first attemperator cooling line 160.

In addition, exhaust from the high pressure steam turbine 30 of the steam turbine system 22 may be mixed with intermediate pressure steam exiting the intermediate pressure superheater 70 and together directed into the primary reheater 58 and a finishing reheater 60 where it may be re-heated before being directed into the intermediate pressure steam turbine 28 of the steam turbine system 22. The primary reheater 58 may be fluidly coupled to the finishing reheater 60 via a reheater connection line. The reheater connection line may extend between, and fluidly couple, the primary reheater 58 to the finishing reheater 60.

In various embodiments, the primary reheater 58 and finishing reheater 60 may also be associated with an inter-stage attemperator 62 for controlling the discharge steam temperature from the finishing reheater 60. Specifically, the inter-stage attemperator 62 may be configured to control the temperature of steam exiting the finishing reheater 60 by injecting cooler feedwater spray into the superheated steam from upstream of the finishing reheater 60 whenever the discharge temperature of the steam exiting the finishing reheater 60 exceeds a predetermined value. For example, the inter-stage attemperator 62 may be disposed in fluid communication on the reheater connection line (e.g., between the primary reheater 58 and the finishing reheater 60). The inter-stage attemperator 62 may be fluidly coupled to the feedwater pump 45. Particularly, the inter-stage attemperator 62 may receive a portion of the water or condensate exiting the feedwater pump 45. For example, as shown, the inter-stage attemperator 62 may receive a flow of water or condensate from the second feedwater line 128. Particularly, the inter-stage attemperator 62 may be in fluid communication with the second feedwater supply line 128 via a second attemperator cooling line 162. It should be appreciated that the water used for the reheat steam temperature control (i.e., the water received by the inter-stage attemperator 62) may come from anywhere on the intermediate or high pressure feedwater circuits, including but not limited to the IPECON discharge into the intermediate pressure drum or HP feedwater for reheat attemperation.

FIGS. 1 through 6 each illustrate a number of valves 150, which are not individually numbered but are illustrated with a common symbol in FIGS. 1 through 6. Each of the valves 150 may be selectively actuated between an open position and a closed position. In an open position, fluid traveling through the line to which the valve 150 is attached may be unrestricted. By contrast, in a closed position, fluid traveling through the line to which the valve 150 is attached may be restricted. Each of the valves may also be selectively actuated to a partially closed (or partially open) position, which may allow the valve 150 to control a flow rate of the fluid traveling through the line to which the valve 150 is attached.

The gas turbine 12 generation cycle is often referred to as the "topping cycle," whereas the HRSG 32 and steam turbine system 22 generation cycle is often referred to as the "bottoming cycle." By combining these two cycles as illustrated in FIGS. 1 through 6, the combined cycle power plant 10 may lead to greater combined plant efficiency. In particular, exhaust heat from the topping cycle may be captured and used to generate steam for use in the bottoming cycle.

The CCPP 10 advantageously recaptures heat from the heated exhaust gas 34 by using the HRSG 32. As illustrated in FIG. 1, components of the gas turbine 12 and the HRSG 32 may be separated into discrete functional units. In other words, the gas turbine 12 may generate the heated exhaust gas 34 and direct the heated exhaust gas 34 toward the HRSG 32, which may be primarily responsible for recapturing the heat from the heated exhaust gas 34 by generating superheated steam. In turn, the superheated steam may be used by the steam turbine system 22 as a source of power. The heated exhaust gas 34 may be transferred to the HRSG 32 through a series of ductwork, which may vary based on the particular design of the CCPP 10.

In many embodiments, the CCPP 10 may further include a fuel heating system 200 for pre-heating fuel supplied to the combustion section 18. For example, the fuel heating system 200 may include a fuel supply line 202 fluidly coupled to the combustion section 18. In many embodiments, the fuel supply line 202 may extend between a fuel supply 204 (e.g., a tank, reservoir, or other fuel source) and the combustion section 18. In exemplary embodiments, as shown in FIGS. 1, 2, and 4-6, the fuel heating system 200 may include a high temperature heat exchanger 206 disposed in thermal communication on the fuel supply line 202. For example, the high temperature heat exchanger 206 may exchange heat between the fuel flowing through the fuel supply line 202 and a thermal fluid. The high temperature heat exchanger 206 may be fluidly coupled to an economizer such that the high temperature heat exchanger 206 receives water from the economizer. Particularly, as shown in FIGS. 1 and 2, the high temperature heat exchanger 206 may be in fluid communication with the forward high pressure economizer 48 via a high temperature input line 210.

Referring specifically to the exemplary embodiments of FIGS. 1 and 2, the feedwater pump 45 may be fluidly coupled to one or more economizers such that the feedwater pump 45 receives water from one of the one or more economizers and provides water to another of the one or more economizers. For example, the feedwater pump 45 may be fluidly coupled (e.g., separately fluidly coupled) to the high temperature heat exchanger 206, the low pressure economizer 40, the intermediate pressure economizer 44, and the aft high pressure economizer 49. Particularly, the feedwater pump 45 may receive water (e.g., via one or more fluid conduits 211, 212) from an outlet of the high temperature heat exchanger 206 and from an outlet of the LPECON 40.

Alternatively, or additionally, as shown by the dashed lines in FIG. 1, the feedwater pump 45 may receive water from the low pressure evaporator 42 (such as a low pressure steam drum of the low pressure evaporator) and/or a deaerator 41. In this way, the feedwater pump 45 may be fluidly coupled to one of the economizer 40, the low pressure evaporator 42, or the deaerator 41, such that the feedwater pump 45 receives water from one or more of the economizer 40, the low pressure evaporator 42, or the deaerator 41. The deaerator 41 may be fluidly coupled to one or more water/steam conveying components of the HRSG 32 and may be operable to remove dissolved gases from the water/steam.

The low pressure economizer 40 may be fluidly coupled to the feedwater pump 45 via a first pump supply line 211, and the high temperature heat exchanger may be fluidly coupled to the feedwater pump 45 via a second pump supply line 212. The first pump supply line 211 may extend (e.g., directly) between the LPECON 40 and the feedwater pump 45. Similarly, the second pump supply line 212 may extend (e.g., directly) between the high temperature heat exchanger 206 and the feedwater pump 45, such that the feedwater pump 45 may receive spent thermal fluid (e.g., water from the high temperature heat exchanger 206 that has undergone an energy transfer) from the high temperature heat exchanger 206.

In such embodiments, the feedwater pump 45 may receive a first flow of water from an outlet of the LPECON 40 (via supply line 211) and a second flow of water from the high temperature heat exchanger 206 (via supply line 212). By returning the water from the high temperature heat exchanger 206 to the feedwater pump 45, the parasitic pump loss is significantly decreased as compared to prior designs. For example, the pressure required, and the power expended, to circulate water to (and through) the high temperature heat exchanger 206 may be closely matched (e.g., equal) to an actual friction loss through the circuit on which the high temperature heat exchanger 206 is positioned.

From the feedwater pump 45, the water may flow into the IPECON 44, an aft high pressure economizer 49, and/or the inter-stage attemperators 56 and 62, e.g., via separate pipes, tubes, or fluid conduits. For example, a first feedwater supply line 126 may extend from the feedwater pump 45 to the aft high pressure economizer 49, and the second feedwater line 128 may extend from the feedwater pump 45 to the IPECON 44. Additionally, the inter-stage attemperator 62 may be in fluid communication with the second feedwater supply line 128 via a second attemperator cooling line 162. Alternatively, or additionally, the inter-stage attemperator 56 may receive water from the feedwater pump 45 (e.g., from the first feedwater supply line 126).

Still referring to FIGS. 1 and 2, the fuel heating system 200 may further include a low temperature heat exchanger 208 disposed in thermal communication on the fuel supply line 202 upstream of the high temperature heat exchanger 206 with respect to a flow of fuel through the fuel supply line 202. The low temperature heat exchanger 208 may operate at a lower temperature than the high temperature heat exchanger 206. In many embodiments, a low temperature input line 216 may fluidly couple, and extend between, the LPECON 40 and the low temperature heat exchanger 208. Additionally, a low temperature output line 218 may fluidly couple, and extend between, the low temperature heat exchanger 208 and the condensate supply line 80. In some embodiments, as shown in FIG. 1, the low temperature output line 218 may fluidly couple to the condensate supply line 80 downstream of the condensate pump 38 with respect to a flow of water through the condensate supply line 80. In other embodiments, as shown in FIG. 2, the low temperature output line 218 may fluidly couple to the condensate supply line 80 upstream of the condensate pump 38 with respect to a flow of water through the condensate supply line 80.

In some embodiments, as shown in FIG. 1, a low temperature bypass line 220 may fluidly couple the low temperature input line 216 to the condensate supply line 80. One or more valves 150 may be disposed in fluid communication on the low temperature bypass line 220, such that the amount (and/or the flow rate) of water entering the low temperature heat exchanger 208 may be regulated by the one or more valves 150 disposed on the low temperature bypass line 220. Additionally, in many embodiments, a low temperature pump 222 may be disposed in fluid communication on the low temperature input line 216.

Figure 3:
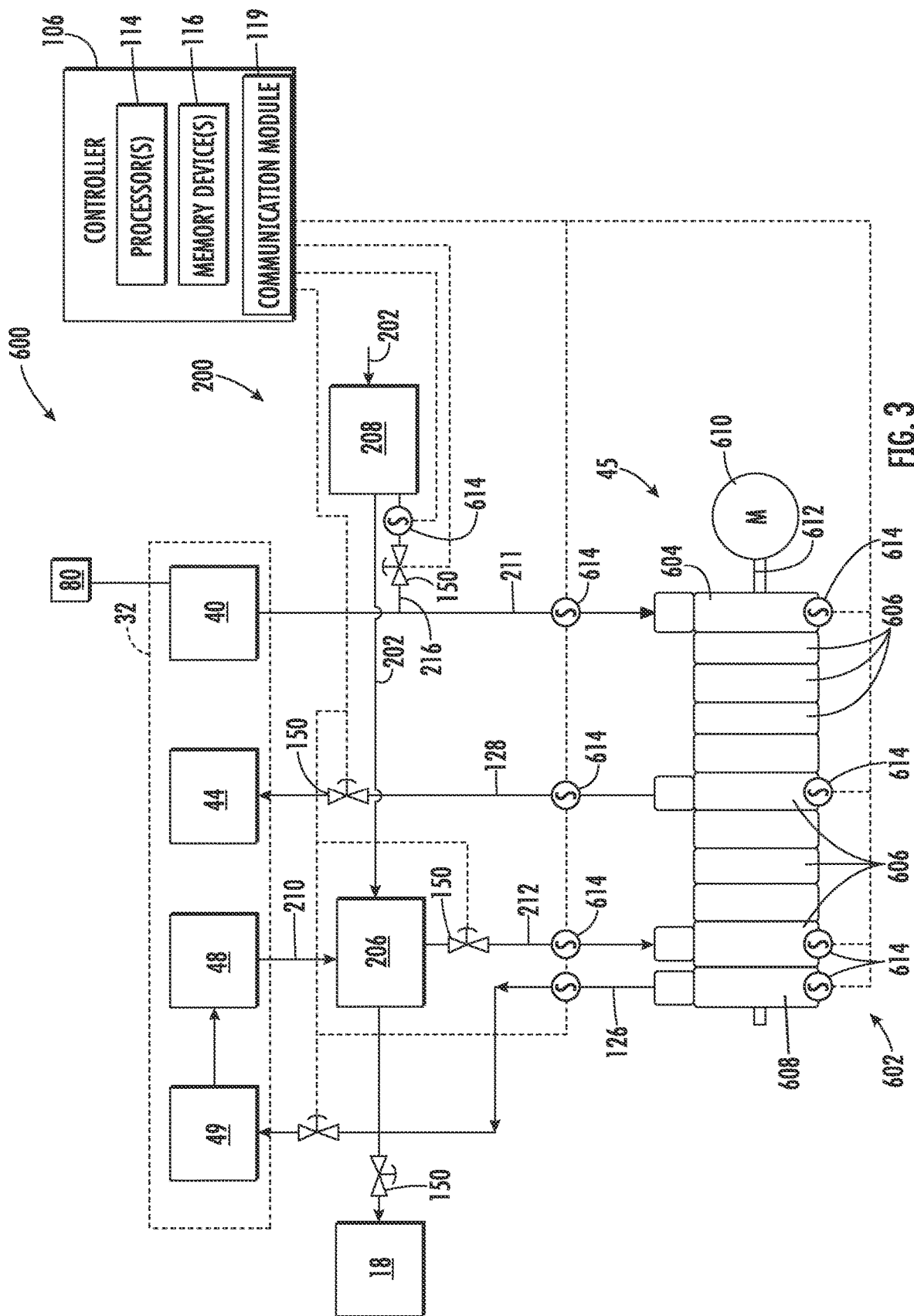
FIG. 3 illustrates a schematic view of a feedwater pump control system in accordance with embodiments of the present disclosure.

Referring now to FIG. 3, a feedwater pump control system 600 is illustrated in accordance with embodiments of the present disclosure. For example, the feedwater pump control system 600 may be employed in the CCPP 10 shown and described above with reference to FIGS. 1 through 2.

As shown in FIG. 3, the feedwater pump control system 600 may include the heat recovery steam generator 32, which includes the low pressure economizer 40, the intermediate pressure economizer 44, an aft high pressure economizer 49, and a forward high pressure economizer 48 (shown in opposite positions for simplicity). The feedwater pump control system 600 may further include the fuel heating system 200, which includes the fuel supply line 202 fluidly coupled to the combustion section 18 of gas turbine 12. The fuel heating system 200 further includes the high temperature heat exchanger 206 and the low temperature heat exchanger 208 disposed in thermal communication on the fuel supply line 202.

In exemplary embodiments, the feedwater pump control system 600 may be implemented in the CCPP 10 described above with reference to FIG. 1 and FIG. 2. Notably, the heat recovery steam generator 32 illustrated in FIG. 3 is intended to show which components may be included in the system without relation to gas flow. By contrast, FIGS. 1, 2, and 4 through 6 show the arrangement of the various components of the HRSG 32 as it relates to the exhaust gas 34 flow through the HRSG 32 (in which the exhaust gas 34 flows from left to right).

In exemplary embodiments, the feedwater pump control system 600 may include a feedwater pump 45 having a plurality of stages 602. For example, the feedwater pump 45 may be a multi-stage pump having a plurality of stages 602. The feedwater pump 45 may include a motor 610 coupled to a shaft 612. The shaft 612 may be coupled to one or more impellers (e.g., one impeller per stage), such that the water moving through the multi-stage feedwater pump 45 progressively increases in pressure as it moves from stage to stage. The plurality of stages 602 may include one or more early stages including an initial stage 604 (or suction side stage), two or a plurality of intermediate stages 606, and one or more late stages including a last or final stage 608. The pressure of the water in each stage of the plurality of stages 602 of the feedwater pump 45 may progressively increase from the initial stage 604, between each intermediate stage 606, to the final stage 608. While the embodiment shown in FIG. 3 illustrates a feedwater pump 45 having eleven stages, it should be appreciated that the feedwater pump 45 may have any number of stages, and the current disclosure should not be limited to any particular number of stages unless specifically recited in the claims.

In many embodiments, the first pump supply line 211 may extend between, and fluidly couple, the LPECON 40 and the initial stage 604 of the plurality of stages 602. That is, water from an outlet of the LPECON 40 may be provided to the initial stage 604 of the plurality of stages 602 (e.g., via a first inlet). The second pump supply line 212 may extend between, and fluidly couple, the high temperature heat exchanger 206 and a first intermediate stage 606. In many embodiments, the first feedwater supply line 126 may extend between, and fluidly couple, a last stage 608 of the plurality of stages 602 and the aft high pressure economizer 49. In this way, at least a portion of water from the last stage 608 of the feedwater pump 45 may be provided to the aft high pressure economizer 49. Additionally, the second feedwater supply line 128 may extend between, and fluidly couple, a second intermediate stage 606 of the plurality of stages 602 and the intermediate pressure economizer 44.

By way of example only, the feedwater pump 45 may include early stages including the initial stage 604 and the first 25% of the stages; intermediate stages following the early stages and extending from 25% to 75% of the stages; and late stages following the intermediate stages and extending the final 25% of the stages and including the last stage 608. In the embodiment shown in FIG. 3, the LPECON 40 may be fluidly coupled to the initial stage 604, the IPECON 44 may be fluidly coupled to an intermediate stage 606 (such as a middle stage or the sixth stage), the high temperature heat exchanger 206 may be fluidly coupled to a late stage 606 (such as a second to last stage or the tenth stage), and the aft high pressure economizer 49 may be fluidly coupled to the last stage 608.

In exemplary embodiments, a sensor(s) 614 (marked with symbol "S" in FIG. 3) may be disposed in one or more of the first pump supply line 211, the second pump supply line 212, the first feedwater supply line 126, and the second feedwater supply line 128. The sensor(s) 614 may be configured to provide data indicative of at least one of a pressure, a temperature, or a flow rate of water. The sensor(s) 614 may provide data indicative of such parameters for the water flowing through the line on which the sensor(s) are attached. For example, a sensor 614 disposed on the first pump supply line 211 may be configured to provide data (e.g., to the controller 106) indicative of at least one of a pressure, a temperature, or a flow rate of water within the first pump supply line 211.

Additionally, in many embodiments, a valve(s) 150 may be disposed on one or more the second pump supply line 212, the first feedwater supply line 126, and the second feedwater supply line 128. Each of the valves 150 may be selectively and independently actuated (e.g., by the controller 106) between an open position and a closed position. In an open position, fluid traveling through the line to which the valve 150 is attached may be unrestricted. By contrast, in a closed position, fluid traveling through the line to which the valve 150 is attached may be restricted. Each of the valves may also be selectively actuated by commands from the controller 106 to a partially closed (or partially open) position, which may allow the valve 150 to control a flow rate of the fluid traveling through the line to which the valve 150 is attached.

In exemplary embodiments, the feedwater pump control system 600 may further include a controller 106 communicatively coupled to the sensor(s) 614 and operatively coupled to the valve(s) 150. For example, the controller 106 may independently actuate each of the valves 150. As shown in FIG. 3, the controller 106 is illustrated as a block diagram to show the suitable components that may be included within the controller 106. For example, the controller 106 may include one or more processor(s) 114 and associated memory device(s) 116 configured to perform a variety of computer-implemented functions (e.g., performing the methods, steps, calculations and the like and storing relevant data as disclosed herein). Additionally, the controller 106 may also include a communications module 119 to facilitate communications between the controller 106 and the various components of the system 600. For example, the communications module 119 may be in communication with the sensor(s) 614 and the valve(s) 150.

Further, the communications module 119 may include a sensor interface (e.g., one or more analog-to-digital converters) to permit signals transmitted from one or more sensors 614 to be converted into signals that can be understood and processed by the processors 114. It should be appreciated that the sensor(s) 614 may be communicatively coupled to the communications module 119 using any suitable means. For example, the sensor(s) 614 may be coupled to the communications module 119 via a wired connection. However, in other embodiments, the sensor(s) may be coupled to the communications module 119 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD), and/or other suitable memory elements.

Such memory device(s) 116 may generally be configured to store suitable computer-readable instructions that, when implemented by the processor(s) 114, configure the controller 106 to perform various functions and/or operations including, but not limited to, monitoring data indicative of a temperature difference between water entering the feedwater pump 45 and water exiting the feedwater pump 45 via the one or more sensors 614. The operations may further include determining when the temperature difference is outside of a predetermined temperature range (or a predetermined temperature difference range). For example, the controller 106 may determine when the temperature difference exceeds a maximum threshold value of the predetermined temperature range or falls below a minimum threshold value of the predetermined temperature range. In response to determining that the temperature difference is outside the predetermined temperature range, the controller 106 may adjust a flow of water to the feedwater pump 45 by actuating the one or more valves 150 to restore the temperature difference to be within the predetermined temperature range. The predetermined temperature range (i.e., the predetermined temperature difference between the water entering the feedwater pump 45 and the water exiting the feedwater pump 45) may be about ±30° F., or such as ±20° F., or such as about ±10° F., or such as about ±5° F.

For example, when the water entering the feedwater pump 45 via the second pump supply line 212 is too hot (e.g., the temperature difference between the water entering the feedwater pump 45 and water exiting the feedwater pump 45 exceeds the maximum threshold of the predetermined temperature range for the feedwater pump 45), then the controller 106 may actuate the valves 150 on the second pump supply line 212 to restrict (or slow the flow rate) of the water traveling therethrough, thereby reducing the temperature in line 212 to be closer to the fuel temperature entering high temperature fuel heater 206. This serves to restore the temperature difference of the water entering/exiting the feedwater pump 45 to be within the predetermined temperature range. By contrast, when the water entering the feedwater pump 45 via the second pump supply line 212 is too cold (e.g., the temperature difference between the water entering the feedwater pump 45 and water exiting the feedwater pump 45 falls below the minimum threshold of the predetermined temperature range for the feedwater pump 45), then the controller 106 may actuate the valves 150 on the second pump supply line 212 to un-restrict (or increase the flow rate) of the water traveling therethrough, thereby causing the high temperature heat exchanger 206 to increase the temperature of the water traveling through the second pump supply line 212 to restore the temperature difference of the water entering/exiting the feedwater pump 45 to be within the predetermined temperature range.

Figure 4:
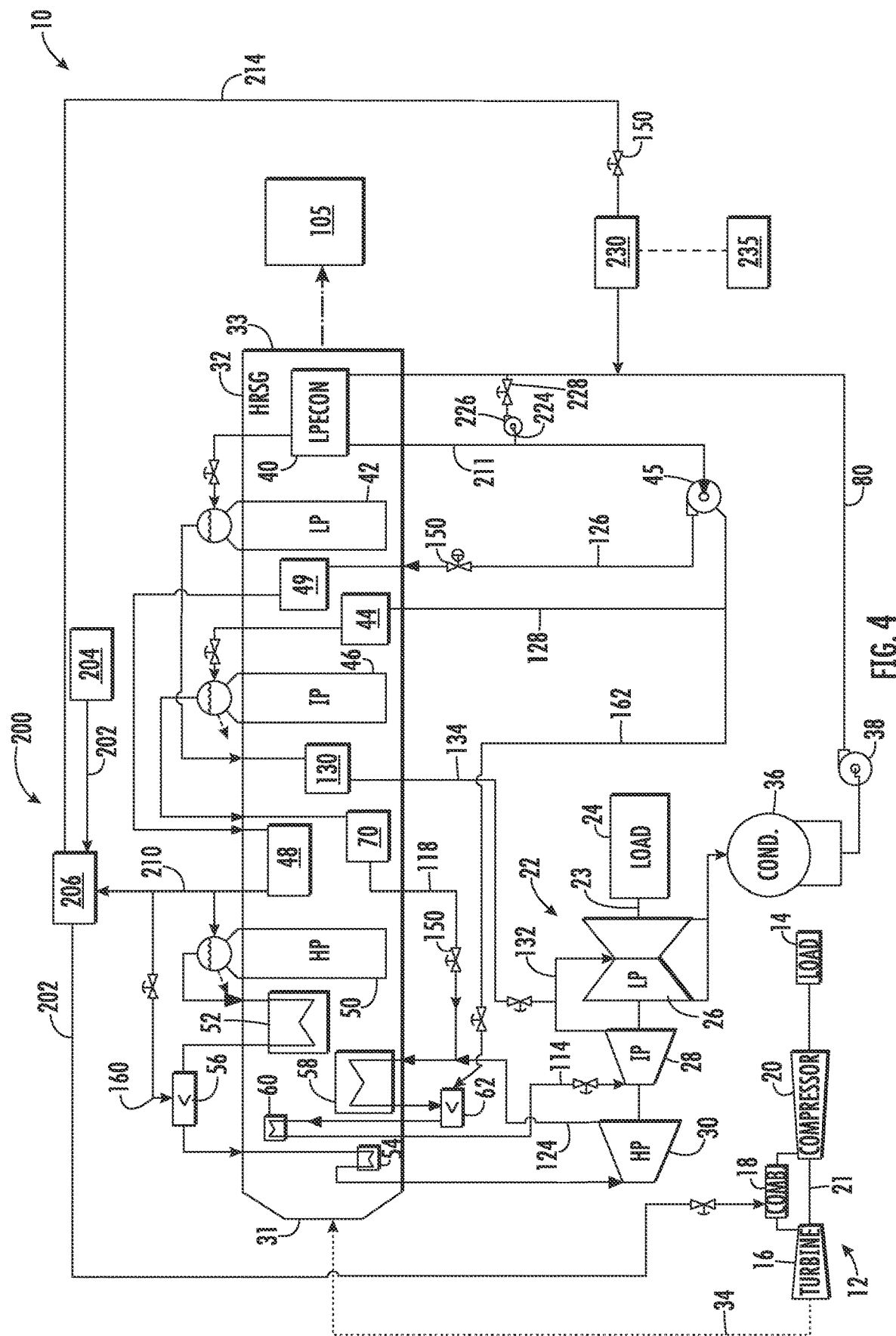
FIG. 4 is a schematic illustration of a combined cycle power plant (CCPP) in accordance with embodiments of the present disclosure.

In various embodiments, as shown in FIGS. 2 and 4, the CCPP 10 may further include a bridge line 224 that fluidly couples, and extends between, the first pump supply line 211 and the condensate supply line 80. In such embodiments, a bridge pump 226 and a bridge valve 228 may be disposed in fluid communication on the bridge line 224. The bridge line 224, the bridge pump 226, and the bridge valve 228 may allow for more robust control of the temperature at the feedwater pump 45 by allowing water from the first pump supply line 211 to be selectively moved back into the condensate supply line 80. This also allows for more robust temperature control of the fuel heating system 200, e.g., particularly more robust temperature control of the low temperature heat exchanger 208.

Referring now to FIG. 4, the fuel heating system 200 of the CCPP 10 is configured without the low temperature heat exchanger 208. In this embodiment, the high temperature heat exchanger 206 may be fluidly coupled to the forward high pressure economizer 48. A high temperature input line 210 may fluidly couple the forward high pressure economizer 48 to the high temperature heat exchanger 206. For example, a high temperature input line 210 may extend between the forward high pressure economizer 48 and the high temperature heat exchanger 206 to supply the high temperature heat exchanger 206 with high temperature water.

In such embodiments, a recirculation line 214 may extend (e.g., directly extend) from the high temperature heat exchanger 206 to the condensate supply line 80. The recirculation line 214 may at least partially fluidly couple the high temperature heat exchanger 206 to the HRSG 32 downstream of the economizer (e.g., the forward high pressure economizer 48) with respect to the flow of exhaust gas 34 through the HRSG 32. For example, the high temperature heat exchanger 206 may be fluidly coupled to the condensate supply line 80 via the recirculation line 214. Particularly, the recirculation line 214 may fluidly couple the high temperature heat exchanger 206 to the condensate supply line 80.

In such embodiments, a hydraulic turbine 230 (or hydro turbine) may be disposed in fluid communication on the recirculation line 214 (outside of the HRSG 32). The hydraulic turbine 230 may be a rotary turbine that converts the energy of the high pressure water traveling through the recirculation line 214 into rotational/electric energy, and while doing so, the hydraulic turbine 230 may advantageously throttle the high pressure water from the high temperature heat exchanger 206 (which is originally supplied from the forward HPECON 48) down to condensate pressure for entry into the condensate supply line 80 without issue.

Additionally, the electrical energy generated by the hydraulic turbine 230 may be used to power one or more components of the CCPP 10. For example, the hydraulic turbine 230 may recover at least a portion of the parasitic loss experienced by the feedwater pump 45. In some embodiments, the electrical energy generated by the hydraulic turbine 230 may be stored in a battery, which may in turn be used to power one or more components of the CCPP 10. For example, as depicted in phantom in FIG. 4, the hydraulic turbine 230 may be electrically coupled to one or more electrical components 235 (such as a battery or other energy storage, a power converter, another component in the HRSG 32 or the CCPP 10, or other electrical components). In this way, the electrical power generated by the hydraulic turbine 230 may be conveyed as a power output to the one or more electrical components 235. It should be appreciated that, in some embodiments, the hydraulic turbine 230 may be disposed on the second pump supply line 212 described above with reference to FIGS. 1 and 2. In such embodiments, the water leaving the hydraulic turbine 230 may join into the first pump supply line 211, and the second pump supply admission may be eliminated.

Figure 5:
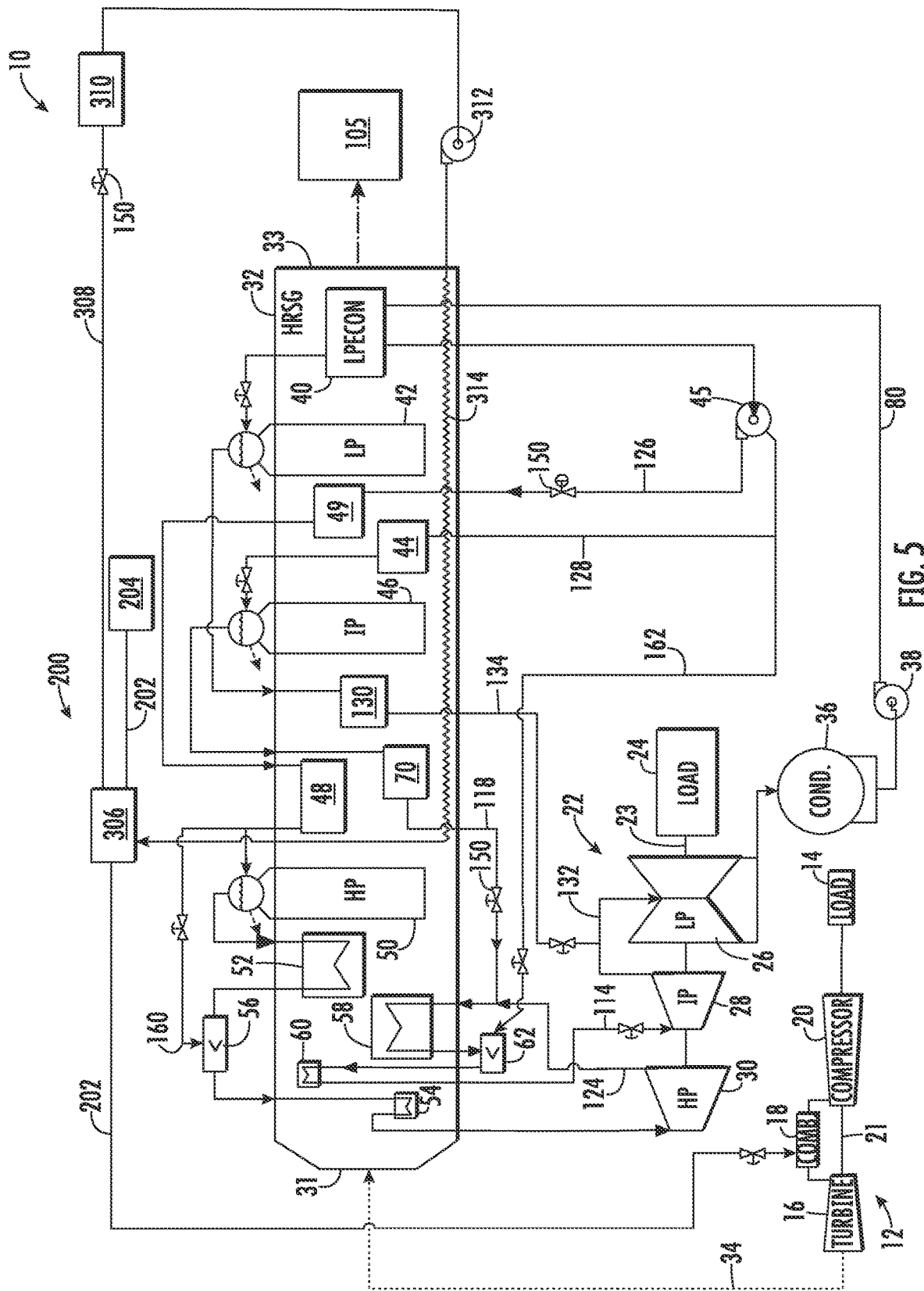
FIG. 5 is a schematic illustration of a combined cycle power plant (CCPP) in accordance with embodiments of the present disclosure.

Referring now to FIG. 5, the fuel heating system 200 may include a high temperature heat exchanger 306 disposed in fluid communication on a dedicated loop 308. Particularly, the high temperature heat exchanger 306 may be disposed in thermal communication on the fuel supply line 202 and on the dedicated loop 308, a portion of which is outside of the HRSG 32. The dedicated loop 308 may extend at least partially through the HRSG 32 and may have a dedicated heat exchanger 314 disposed within the HRSG 32. In many embodiments, the dedicated loop 308 may be collectively formed by one or more fluid conduits extending from an outlet of the high temperature heat exchanger 306 to an inlet of the high temperature heat exchanger 306. For example, in such embodiments, the dedicated loop 308 may be fluidly isolated from the various components of the HRSG 32 (e.g., not in fluid communication with the water/steam that circulates through the various HRSG 32 components). In this way, the dedicated loop 308 may circulate a non-water thermal fluid (i.e., a thermal fluid that is different than water). In exemplary embodiments, thermal fluid in the dedicated loop 308 may be a synthetic organic thermal fluid (e.g., synthetic oil). Particularly, the thermal fluid in the dedicated loop may be one of the DowTherm™ heat transfer fluids from Dow Chemical Company or the Therminol® heat transfer fluids from Eastman Chemical Company of Kingsport, TN.

As shown in FIG. 5, the dedicated loop 308 may include an expansion tank 310, a recirculation pump 312, and a dedicated heat exchanger 314. In exemplary embodiments, the expansion tank 310, the recirculation pump 312, and the dedicated heat exchanger 314 may each be in fluid communication with the dedicated loop 308, such that the thermal fluid passes through each of the components on the dedicated loop 308. The expansion tank 310 and the recirculation pump 312 may be disposed outside of the HRSG 32 (such that these components are not exposed to the high temperature exhaust gas flowing through the HRSG 32). The expansion tank 310 may be a container, reservoir, or vessel that is used to protect the dedicated loop 308 from excessive pressure. For example, in some embodiments, the expansion tank 310 may be at least partially filled with air, which may absorb (e.g., via the compressibility of the air) some of the shock caused by excessive pressure from thermal expansion of the thermal fluid in the dedicated loop 308.

The dedicated heat exchanger 314 may be disposed in the HRSG 32, such that the exhaust gas 34 flowing through the HRSG 32 may transfer heat energy to the thermal fluid in the dedicated loop 308 for use in the high temperature heat exchanger 306. In many embodiments, the dedicated heat exchanger 314 may extend within the HRSG 32 from an outlet 33 of the HRSG 32 to upstream of the forward high pressure economizer 48 with respect to the flow of exhaust gas through the HRSG 32.

Figure 6:
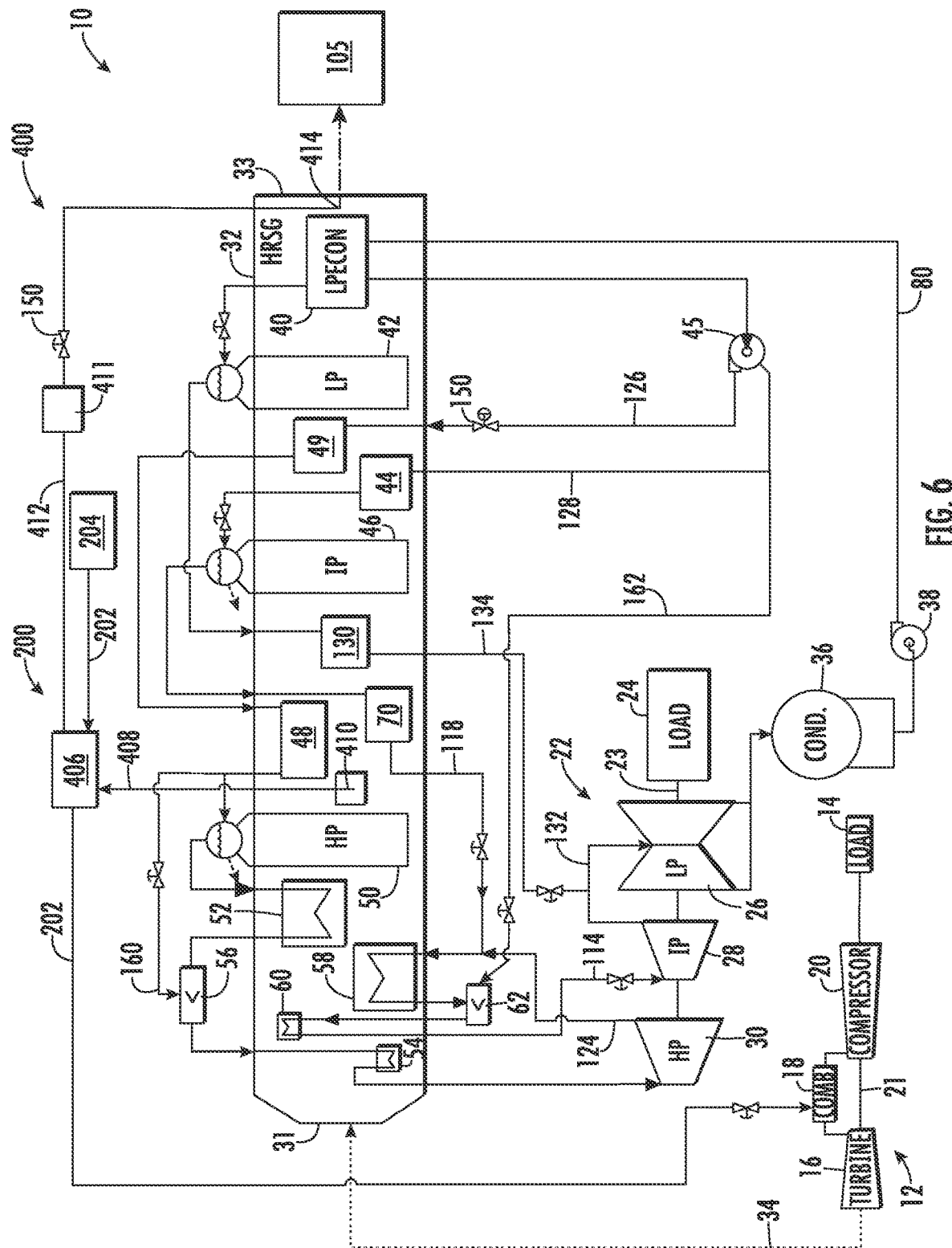
FIG. 6 is a schematic illustration of a combined cycle power plant (CCPP) in accordance with embodiments of the present disclosure.

Referring now to FIG. 6, the fuel heating system 200 may include a high temperature heat exchanger 406 disposed in thermal communication on the fuel supply line 202. In such embodiments, the high temperature heat exchanger 406 may exchange heat between a portion of extracted exhaust gas 34 from the HRSG 32 and the fuel traveling through the fuel supply line 202. For example, the CCPP 10 may further include an exhaust extraction system 400 that removes a portion of the exhaust gas 34 from the HRSG 32 to be used for heating one or more components (such as the high temperature heat exchanger 406) outside of the HRSG 32. The exhaust extraction system 400 may thermally couple the HRSG 32 and the high temperature heat exchanger 406.

In exemplary embodiments, the exhaust extraction system 400 may include an exhaust extraction duct 408 extending from within the HRSG 32 to outside the HRSG 32 and an exhaust return duct 412 extending from outside the HRSG 32 to inside the HRSG 32. The exhaust extraction duct 408 may extend from and fluidly couples the HRSG 32 to the high temperature heat exchanger 406. Particularly, as shown in FIG. 6, the exhaust extraction duct 408 may extend from an inlet 410 within the HRSG 32 to the high temperature heat exchanger 406. The inlet 410 may be disposed upstream of the forward high pressure economizer 48 with respect to the flow of exhaust gas through the HRSG 32. Additionally, the exhaust return duct 412 may extend from the high temperature heat exchanger 406 to an outlet 414 within the HRSG 32. The outlet 414 may be disposed within the HRSG 32 immediately downstream of the LPECON 40 (and/or immediately upstream of the outlet 33 to the HRSG 32) with respect to the flow of exhaust gas through the HRSG 32. Alternately, the outlet 414 may be defined in or directly coupled to the exhaust stack 105 without being directed through the HRSG 32. Further, in other embodiments, the outlet 414 may be disposed within the HRSG 32 upstream of the LPECON 40.

In various embodiments, a fan 411 may be disposed on the exhaust return duct 412 and may function to pull a portion of the exhaust gas 34 from the HRSG 32 towards the high temperature heat exchanger 406. In exemplary embodiments, the fan 411 may be disposed downstream (e.g., immediately downstream) of the high temperature heat exchanger 406 with respect to the flow of exhaust gases 34 through the exhaust return duct 412. The fan 411 may function to create a pressure differential within the exhaust extraction system 400 that moves exhaust gas from the inlet 410, through the exhaust extraction duct 408 and the exhaust return duct 412, to the outlet 414.

The CCPP 10 described above with reference to FIGS. 1, 2, and 4-6 and the feedwater pump control system 600 described above with reference to FIG. 3 may each be capable of achieving a fuel temperature of greater than about 480° F. (about 250° C.) at the inlet of the combustion section 18 with reduced pumping power as compared to prior designs. For example, returning the water from the high temperature heat exchanger 206 to the feedwater pump 45 may advantageously reduce the overall parasitic pumping losses experienced by the CCPP 10 system while maintaining the desired fuel temperature at the inlet of the combustion section 18.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be encompassed within the scope of the claims if they include structural elements that do not differ from the literal language of the claims, or if they include equivalent structural elements with insubstantial differences from the literal language of the claims.

Further aspects of the invention are provided by the subject matter of the following clauses:

A combined cycle power plant (CCPP) comprising: a gas turbine having a compressor section, a combustion section, and a turbine section; a heat recovery steam generator (HRSG) having a first economizer, the HRSG receiving a flow of exhaust gas from the turbine section; a fuel heating system comprising a fuel supply line and a high temperature heat exchanger disposed in thermal communication on the fuel supply line, the fuel supply line fluidly coupled to the combustion section, the high temperature heat exchanger fluidly coupled to the first economizer such that the high temperature heat exchanger receives water from the first economizer; and a feedwater pump fluidly coupled to the high temperature heat exchanger.

The CCPP as in one or more of these clauses, further comprising at least one of an evaporator or a deaerator, and wherein the feedwater pump is fluidly coupled to one of the first economizer, the evaporator, or the deaerator.

The CCPP as in one or more of these clauses, wherein the feedwater pump is a multi-stage pump.

The CCPP as in one or more of these clauses, wherein the fuel heating system further comprises a low temperature heat exchanger disposed in thermal communication on the fuel supply line upstream of the high temperature heat exchanger with respect to a flow of fuel through the fuel supply line.

The CCPP as in one or more of these clauses, further comprising a steam turbine system fluidly coupled to a second economizer within the HRSG at least partially via a condensate supply line.

The CCPP as in one or more of these clauses, wherein the first economizer is a high pressure economizer, wherein the second economizer is a low pressure economizer upstream of the high pressure economizer with respect to a flow of the exhaust gas through the HRSG, wherein a high temperature input line fluidly couples the high pressure economizer to the high temperature heat exchanger, and wherein a low temperature input line fluidly couples the low pressure economizer to the low temperature heat exchanger.

The CCPP as in one or more of these clauses, wherein a low temperature output line fluidly couples the low temperature heat exchanger to the condensate supply line.

The CCPP as in one or more of these clauses, wherein a low temperature bypass line fluidly couples the low temperature input line to the condensate supply line.

The CCPP as in one or more of these clauses, wherein a low temperature pump is disposed in fluid communication on the low temperature input line.

The CCPP as in one or more of these clauses, wherein the low pressure economizer is fluidly coupled to the feedwater pump via a first pump supply line, and wherein the high temperature heat exchanger is fluidly coupled to the feedwater pump via a second pump supply line.

The CCPP as in one or more of these clauses, wherein a bridge line fluidly couples the first pump supply line to the condensate supply line, and wherein a bridge pump and a bridge valve are disposed in fluid communication on the bridge line.

A combined cycle power plant (CCPP) comprising: a gas turbine having a compressor section, a combustion section, and a turbine section; a heat recovery steam generator (HRSG) that receives a flow of exhaust gas from the turbine section, the HRSG having a high pressure economizer and a low pressure economizer; a fuel heating system comprising a fuel supply line, a high temperature heat exchanger, and a low temperature heat exchanger, the fuel supply line fluidly coupled to the combustion section, the high temperature heat exchanger and the low temperature heat exchanger disposed in thermal communication on the fuel supply line, the high temperature heat exchanger fluidly coupled to the high pressure economizer, and the low temperature heat exchanger fluidly coupled to the low pressure economizer; and a feedwater pump fluidly coupled to the high temperature heat exchanger.

The CCPP as in one or more of these clauses, wherein the feedwater pump is a multi-stage pump.

The CCPP as in one or more of these clauses, wherein the low temperature heat exchanger is disposed on the fuel supply line upstream of the high temperature heat exchanger with respect to a flow of fuel through the fuel supply line.

The CCPP as in one or more of these clauses, further comprising a steam turbine system fluidly coupled to the low pressure economizer at least partially via a condensate supply line.

The CCPP as in one or more of these clauses, wherein the low pressure economizer is downstream of the high pressure economizer with respect to the flow of the exhaust gas through the HRSG, wherein a high temperature input line fluidly couples the high pressure economizer to the high temperature heat exchanger, and wherein a low temperature input line fluidly couples the low pressure economizer to the low temperature heat exchanger.

The CCPP as in one or more of these clauses, wherein a low temperature output line fluidly couples the low temperature heat exchanger to the condensate supply line.

The CCPP as in one or more of these clauses, wherein the low pressure economizer is fluidly coupled to the feedwater pump via a first pump supply line, and wherein the high temperature heat exchanger is fluidly coupled to the feedwater pump via a second pump supply line.

The CCPP as in one or more of these clauses, wherein a bridge line fluidly couples the first pump supply line to a condensate supply line, and wherein a bridge pump and a bridge valve are disposed in fluid communication on the bridge line.

A feedwater pump control system comprising: a heat recovery steam generator (HRSG) having a low pressure economizer and at least one high pressure economizer; a fuel heating system having a fuel supply line fluidly coupled to a combustion section, a high temperature heat exchanger, and a low temperature heat exchanger disposed in thermal communication on the fuel supply line; a feedwater pump having a plurality of stages; a first pump supply line extending between the one of the low pressure economizer, a low pressure steam drum, or a deaerator, and an initial stage of the plurality of stages; a second pump supply line extending between the high temperature heat exchanger and an intermediate stage of the plurality of stages; a feedwater supply line extending between a last stage of the plurality of stages and the at least one high pressure economizer; one or more sensors disposed on one or more of the first pump supply line, the second pump supply line, and the feedwater supply line, the sensor configured to provide data indicative of at least one of a pressure, a temperature, or a flow rate of water; one or more valves disposed on one or more of the second pump supply line and the feedwater supply line; and a controller communicatively coupled to the sensor and operatively coupled to the valve, the controller comprising memory and one or more processors, the memory storing instructions that when executed by the one or more processors causes the feedwater pump control system to perform operations including: monitoring data indicative of a temperature difference between water entering the feedwater pump and water exiting the feedwater pump via the one or more sensors; determining when the temperature difference is outside of a predetermined temperature range; and adjusting a flow of water to the feedwater pump by actuating the one or more valves to restore the temperature difference to be within the predetermined temperature range.

What is claimed is:

1. A combined cycle power plant (CCPP) comprising: a gas turbine having a compressor section, a combustion section, and a turbine section; a heat recovery steam generator (HRSG) having a high pressure economizer, comprising a forward high pressure economizer and an aft high pressure economizer in series, and a low pressure economizer, the HRSG receiving a flow of exhaust gas from the turbine section; a fuel heating system comprising a fuel supply line and a high temperature heat exchanger disposed in thermal communication on the fuel supply line, the fuel supply line fluidly coupled to the combustion section, the high temperature heat exchanger fluidly coupled to the forward high pressure economizer such that the high temperature heat exchanger receives water from the forward high pressure economizer; and a feedwater pump fluidly coupled to the high temperature heat exchanger, wherein a first pump supply line extends from the low pressure economizer to a first inlet of the feedwater pump, and wherein the high temperature heat exchanger is fluidly coupled to a second inlet of the feedwater pump via a second pump supply line.

2. The CCPP as in claim 1, further comprising at least one of an evaporator or a deaerator, and wherein the feedwater pump is fluidly coupled to one of the evaporator or the deaerator.

3. The CCPP as in claim 2, wherein the feedwater pump is a multi-stage pump.

4. The CCPP as in claim 1, wherein the fuel heating system further comprises a low temperature heat exchanger disposed in thermal communication on the fuel supply line upstream of the high temperature heat exchanger with respect to a flow of fuel through the fuel supply line.

5. The CCPP as in claim 1, further comprising a steam turbine system fluidly coupled to the low pressure economizer within the HRSG at least partially via a condensate supply line.

6. The CCPP as in claim 5, wherein the low pressure economizer is disposed downstream of the high pressure economizer with respect to a flow of the exhaust gas through the HRSG, wherein a high temperature input line fluidly couples the high pressure economizer to the high temperature heat exchanger, and wherein a low temperature input line fluidly couples the low pressure economizer to the low temperature heat exchanger.

7. The CCPP as in claim 6, wherein a low temperature output line fluidly couples the low temperature heat exchanger to the condensate supply line.

8. The CCPP as in claim 6, wherein a low temperature bypass line fluidly couples the low temperature input line to the condensate supply line.

9. The CCPP as in claim 6, wherein a low temperature pump is disposed in fluid communication on the low temperature input line.

10. The CCPP as in claim 5, wherein a bridge line fluidly couples the first pump supply line to the condensate supply line, and wherein a bridge pump and a bridge valve are disposed in fluid communication on the bridge line.

11. A combined cycle power plant (CCPP) comprising: a gas turbine having a compressor section, a combustion section, and a turbine section; a heat recovery steam generator (HRSG) that receives a flow of exhaust gas from the turbine section, the HRSG having a high pressure economizer, comprising a forward high pressure economizer and an aft high pressure economizer in series, and a low pressure economizer; a fuel heating system comprising a fuel supply line, a high temperature heat exchanger, and a low temperature heat exchanger, the fuel supply line fluidly coupled to the combustion section, the high temperature heat exchanger and the low temperature heat exchanger disposed in thermal communication on the fuel supply line, the high temperature heat exchanger fluidly coupled to the forward high pressure economizer, and the low temperature heat exchanger fluidly coupled to the low pressure economizer; and a feedwater pump fluidly coupled to the high temperature heat exchanger, wherein a first pump supply line extends from the low pressure economizer to a first inlet of the feedwater pump, and wherein the high temperature heat exchanger is fluidly coupled to a second inlet of the feedwater pump via a second pump supply line.

12. The CCPP as in claim 11, wherein the feedwater pump is a multi-stage pump.

13. The CCPP as in claim 11, wherein the low temperature heat exchanger is disposed on the fuel supply line upstream of the high temperature heat exchanger with respect to a flow of fuel through the fuel supply line.

14. The CCPP as in claim 11, further comprising a steam turbine system fluidly coupled to the low pressure economizer at least partially via a condensate supply line.

15. The CCPP as in claim 14, wherein the low pressure economizer is downstream of the high pressure economizer with respect to the flow of the exhaust gas through the HRSG, wherein a high temperature input line fluidly couples the high pressure economizer to the high temperature heat exchanger, and wherein a low temperature input line fluidly couples the low pressure economizer to the low temperature heat exchanger.

16. The CCPP as in claim 14, wherein a low temperature output line fluidly couples the low temperature heat exchanger to the condensate supply line.

17. The CCPP as in claim 14, wherein a bridge line fluidly couples the first pump supply line to the condensate supply line, and wherein a bridge pump and a bridge valve are disposed in fluid communication on the bridge line.

18. A feedwater pump control system comprising:
a heat recovery steam generator (HRSG) having a low pressure economizer and at least one high pressure economizer;
a fuel heating system having a fuel supply line fluidly coupled to a combustion section, a high temperature heat exchanger, and a low temperature heat exchanger disposed in thermal communication on the fuel supply line;
a feedwater pump having a plurality of stages;

a first pump supply line extending between the one of the low pressure economizer, a low pressure steam drum, or a deaerator, and an initial stage of the plurality of stages;

a second pump supply line extending between the high temperature heat exchanger and an intermediate stage of the plurality of stages;

a feedwater supply line extending between a last stage of the plurality of stages and the at least one high pressure economizer;

one or more sensors disposed on one or more of the first pump supply line, the second pump supply line, and the feedwater supply line, the sensor configured to provide data indicative of at least one of a pressure, a temperature, or a flow rate of water;

one or more valves disposed on one or more of the second pump supply line and the feedwater supply line; and a controller communicatively coupled to the sensor and operatively coupled to the valve, the controller comprising memory and one or more processors, the memory storing instructions that when executed by the one or more processors causes the feedwater pump control system to perform operations including:

monitoring data indicative of a temperature difference between water entering the feedwater pump and water exiting the feedwater pump via the one or more sensors;

determining when the temperature difference is outside of a predetermined temperature range; and adjusting a flow of water to the feedwater pump by actuating the one or more valves to restore the temperature difference to be within the predetermined temperature range.

\* \* \* \* \*